United States Patent [19]

Strader

[11] 4,202,564
[45] May 13, 1980

[54] TANDEM AXLE SUSPENSION SYSTEM

[75] Inventor: Don S. Strader, Marietta, Ga.

[73] Assignee: Motor Wheel Corporation, Lansing, Mich.

[21] Appl. No.: 940,182

[22] Filed: Sep. 7, 1978

[51] Int. Cl.² .............................................. B60G 5/04
[52] U.S. Cl. ................................... 280/678; 280/661
[58] Field of Search ............... 280/676, 677, 678, 679, 280/680, 681, 682, 683, 684, 685, 686, 687, 661

[56] References Cited

U.S. PATENT DOCUMENTS

| | | | |
|---|---|---|---|
| 2,265,518 | 12/1941 | Coote | 280/681 |
| 2,653,035 | 9/1953 | Ward | 280/682 |
| 3,124,370 | 3/1964 | Traugott | 280/661 |
| 3,241,856 | 3/1966 | Raidel | 280/681 |
| 3,323,811 | 6/1967 | Nelson | 280/681 |
| 3,434,707 | 3/1969 | Raidel | 280/712 |
| 3,458,213 | 7/1969 | Chaney | 280/676 |
| 3,471,165 | 10/1969 | Raidel | 280/687 |
| 3,493,243 | 2/1970 | Butler | 280/678 |
| 3,526,413 | 9/1970 | Muller | 280/661 |
| 3,751,063 | 8/1973 | Raidel | 280/680 |

Primary Examiner—Robert R. Song
Assistant Examiner—John A. Carroll
Attorney, Agent, or Firm—Barnes, Kisselle, Raisch & Choate

[57] ABSTRACT

A tandem axle suspension system wherein laterally spaced walking beams are pivotally mounted on a trunnion tube and extend forwardly and rearwardly therefrom to overly forward and rearward axles. A pair of arms are coupled by adjustable bushings to each walking beam and extend respectively forwardly and rearwardly underlying the beam. The axles are rigidly coupled to the arms, and air springs are disposed between each axle and the corresponding walking beam portion overlying the axle.

22 Claims, 8 Drawing Figures

TANDEM AXLE SUSPENSION SYSTEM

The present invention is directed to a tandem axle suspension system for non-driven vehicle wheels, and more particularly to an air spring suspension system which is specifically adapted for use with mobile homes, buses, travel trailers or the like.

A general object of the present invention is to provide a suspension system for tandem axle vehicles which furnishes a smooth and comfortable ride over a wide variety of terrain conditions. More specifically, it is an object of the present invention to provide a suspension system of the described type which combines the comfort and load-leveling capability of an air suspension system with the advantages of a walking beam suspension system for distributing compression load between the air springs where roughness of the terrain is such that the displacement of one axle cannot be absorbed completely in the associated springs.

Another object of the invention is to provide a suspension of the described type which inherently tends to correct vehicle roll commonly associated with air spring suspension systems and caused by a bump or a lateral gust of wind, for example.

A further object of the invention is to provide a tandem axle suspension system which includes facility for adjusting parallelism between the tandem axles.

Yet another object of the invention is to provide a suspension system of the described type which is particularly well adapted for use with mobile homes. More specifically, an object of the invention is to provide a suspension system which may readily be removed from a mobile home after the latter has been located at the home site, and may thereafter be reused.

The invention, together with additional objects, features and advantages thereof, will be best understood from the following description, the appended claims and the accompanying drawings in which:

Figure 1:
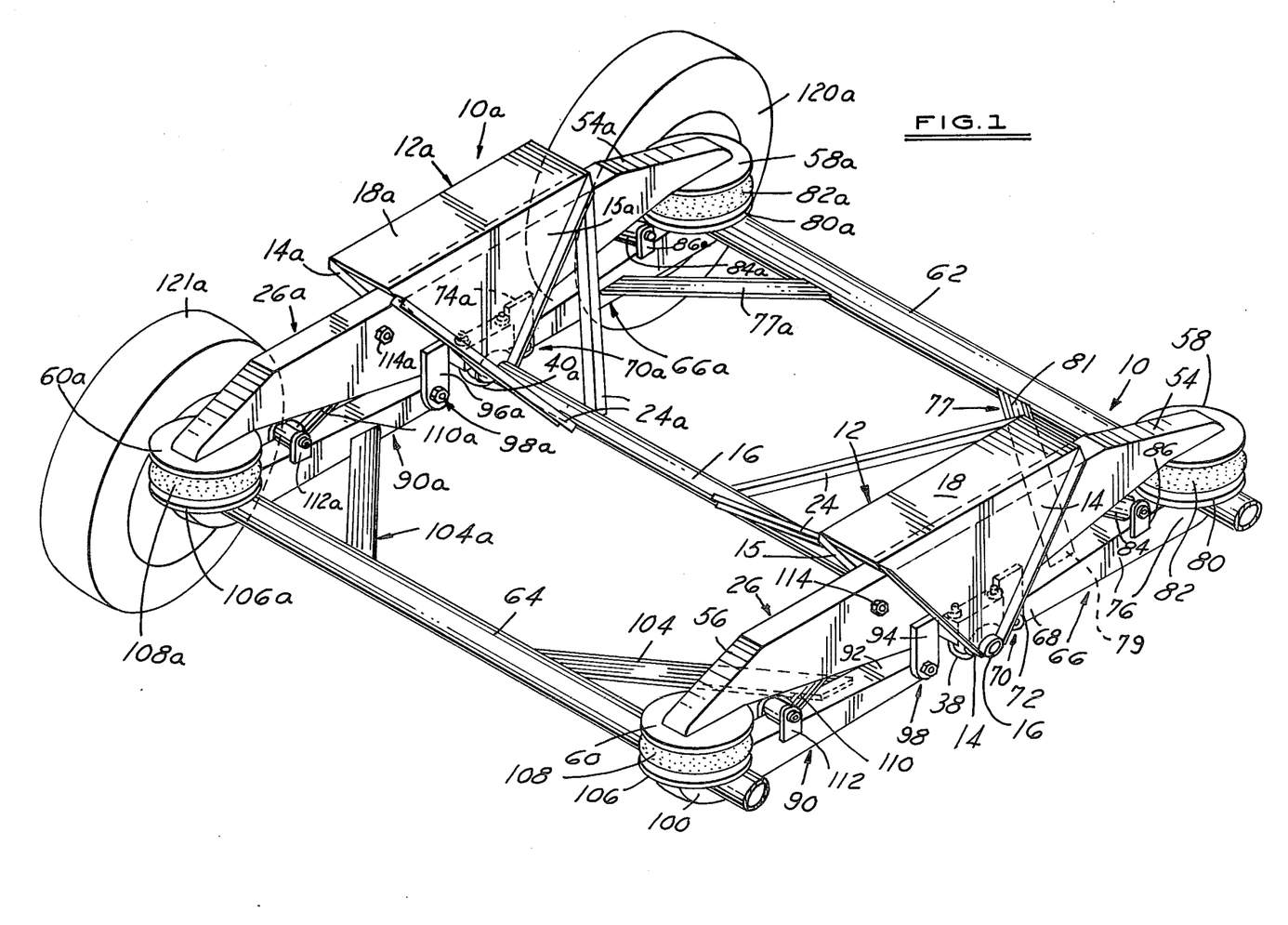
FIG. 1 is a perspective view of a tandem axle suspension system in accordance with the invention.

Referring to FIG. 1, it will be appreciated that the presently preferred embodiment of the tandem axle suspension system illustrated therein comprises identical suspension structures 10 and 10a adapted to be disposed adjacent opposite lateral sides of a vehicle frame. Accordingly, suspension structure 10 will be described in detail hereinafter in connection with FIGS. 2–8, it being understood that the structure 10a on the opposing side of the vehicle is a mirror image thereof and is indicated in FIG. 1 by identical reference numerals followed by the suffix "a."

Referring now to FIGS. 1-4, a downwardly tapering hollow suspension pedestal 12 is adapted to depend from a vehicle frame, and has inner and outer walls 15,14 welded or otherwise coupled at their lower or narrow ends to a trunnion tube 16 which extends laterally across the vehicle frame to the opposing suspension system 10a. Pedestal 12 has a removable top 18 which carries clamps 20 or the like for removably coupling the suspension system to the I-beam 22 of a vehicle frame. Support braces 24 extend downwardly and inwardly from opposite upper corners of inner pedestal wall 15 and are welded to trunnion tube 16. A hollow compensating or walking suspension beam 26 of generally rectangular cross section is pivotally coupled within pedestal 12 to an outer end 28 of trunnion tube 16 by a bushing 30 comprising split semicylindrical sleeve segments 32,33 (FIG. 2) of elastomeric material, and by a split collar comprising an upper portion 36 fixedly attached to beam 26 and to a lower portion 34. A pair of U-bolts 38,40 encompass lower collar portion 34, one on either lateral side of the walking beam. Each U-bolt has a pair of threaded ends 42 which extend upwardly through the corresponding clamp 44 or 45 welded to walking beam 26, and receive respective nuts 46 and lock washers 48 pivotally to clamp walking beam 26 and collar sections 34,36 to trunnion tube 16 through bushing 30. A pair of thrust washers 50,52 separate and space the axial ends of collar sections 34,36 from the opposing internal surfaces of pedestal walls 14,15. It will be evident that walking beam 26 is assembled to trunnion tube 16 with pedestal top 18 removed.

Figure 3:
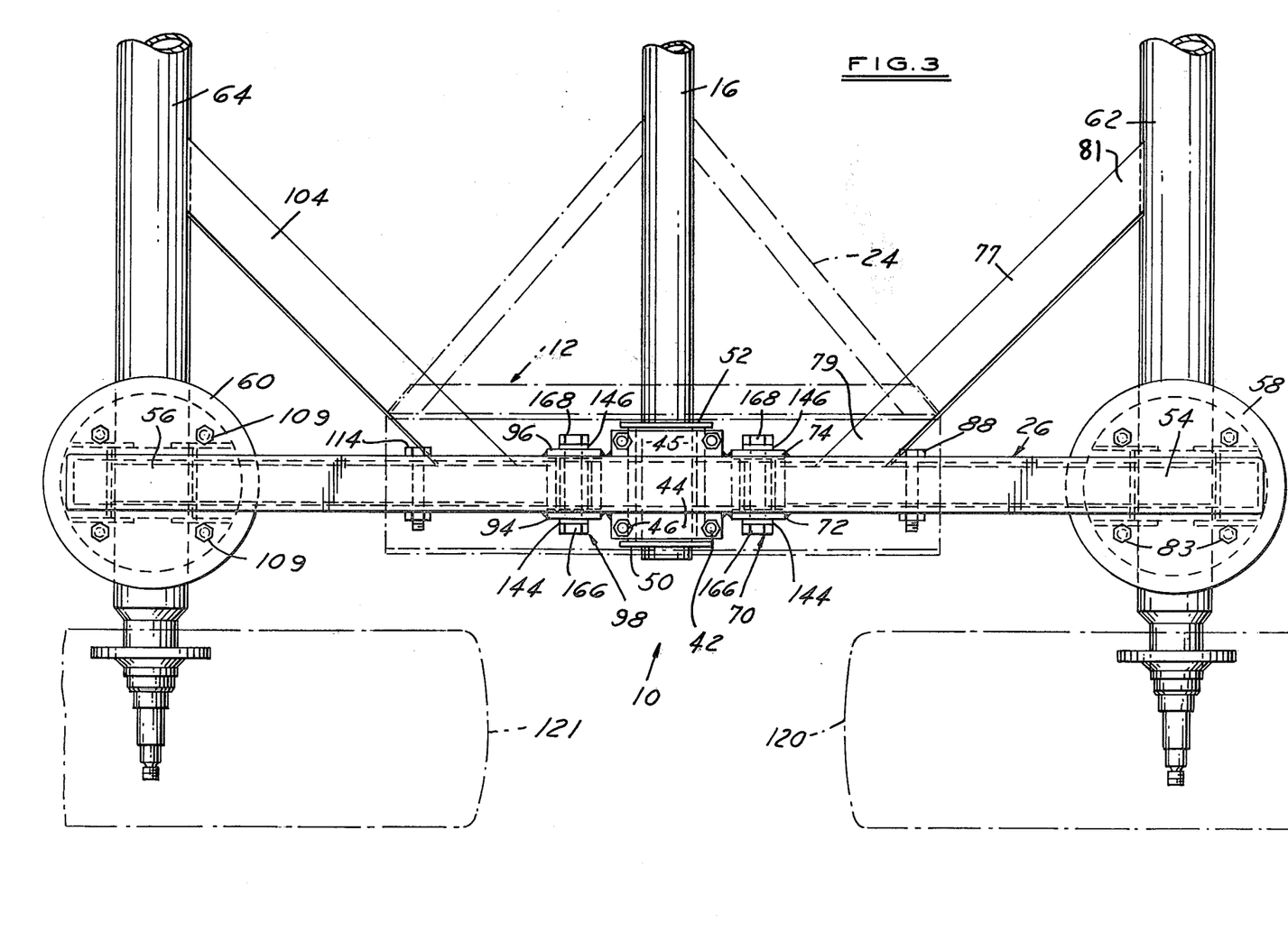
FIG. 3 is a fragmentary plan view of the suspension system approximately taken along the line 3—3 in FIG. 2.
Figure 4:
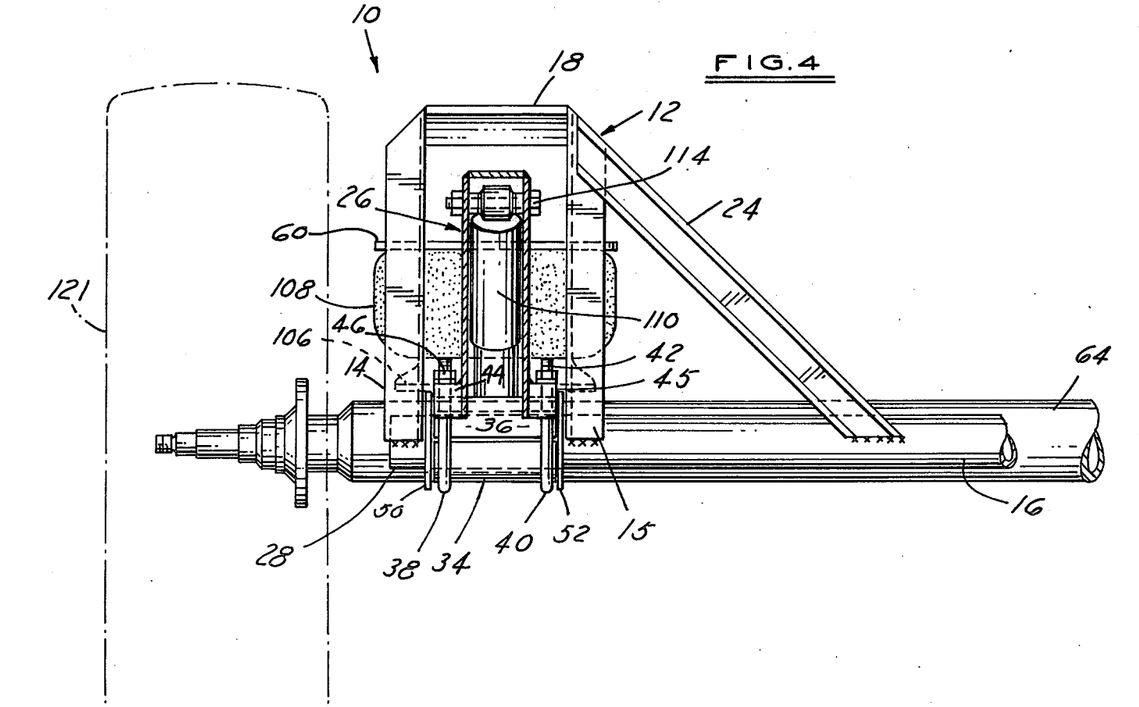
FIGS. 4 and 5 are sectional views taken along the respective lines 4—4 and 5—5 in FIG. 2.
Figure 5:
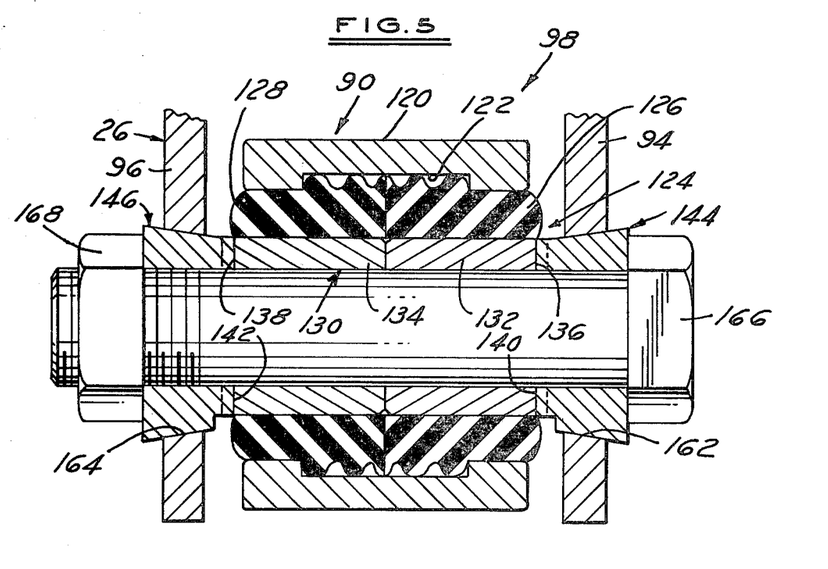

Walking beam 26 extends laterally (radially) of trunnion tube 16, and substantially uniformly tapers narrowingly in vertical dimension from within pedestal 12 to forward and rearward beam ends 54,56. Downwardly directed spring plates 58,60 are welded to beam ends 54,56 overlying forward and rearward tubular axles 62,64 respectively. A hollow forward axle-supporting torque arm or beam 66 of rectangular cross section has its inner end 68 pivotally coupled through an adjustable bushing assembly 70 to parallel inner and outer hanger straps 72,74 (FIG. 3) extending downwardly from and rigidly coupled to walking beam 26. An outer end 76 of torque arm 66 terminates in an upwardly directed part-cylindrical shoulder 78 which encompasses and is welded or otherwise rigidly attached to forward axle 62. An upwardly directed spring support (plate) 80 is welded to axle 62 and has a circular plate 81 underlying and generally parallel to spring plate 58 affixed to walking beam 26. A conventional air spring 82 is disposed between plates 58,81 and is mounted thereto by bolts 83 (FIG. 3). A conventional shock absorber 84 is pivotally coupled at one end between the ears 86 extending upwardly from torque arm 66, and is received at its other end within hollow walking beam 26 and pivotally coupled thereto as by a bolt 88. A forward track bar 77 is rigidly coupled at a rearward end 79 to the inner end 68 of torque beam 66, and extends inwardly and forwardly of the torque beam at an acute angle with respect thereto. The forward end 81 of track bar 77 is welded or otherwise rigidly coupled to forward vehicle axle 62.

A rear axle-supporting torque arm or beam 90 is received at one end 92 between the laterally spaced outer and inner hanger straps 94,96 (FIGS. 3 and 5) and is pivotally coupled thereto by an adjustable bushing assembly 98. An outer and rearward end 100 of torque arm 90 terminates in an upwardly directed part-cylindrical shoulder 102 which encompasses and is welded to rear vehicle axle 64. A track bar 104 extends at an angle between and is welded at either end to torque arm 90 and axle 64. A spring support plate 106 is rigidly mounted to axle 64 underlying walking beam spring plate 60, and an air spring 108 is mounted by bolts 109 between plates 60,106. A shock absorber 110 is pivotally coupled at one end to torque arm 90 between the tabs 112 extending upwardly therefrom, and is received in its other end within walking beam 26 and pivotally coupled thereto as by a bolt 114.

In the general operation of the invention to the extent thus far described and in accordance with one important feature thereof, walking beam 26 cooperates with air springs 82,108 (and 82a,108a) to distribute the spring compression load therebetween where roughness of the terrain is such that the displacement of one wheel or axle cannot be absorbed completely in the associated springs. More specifically, where the terrain is relatively smooth and the wheels 120,120a associated with front axle 62 encounter a relatively small bump as the trailer is moving, the transitory vertical displacement of the front wheels in traveling over the bump will be absorbed entirely in front springs 82,82a. Inertia of walking beams 26,26a prevents rotation thereof about trunnion tube 16 during this transitory situation and the compression forces are small enough to be absorbed entirely by deflection of the front air springs. On the other hand, where the front wheels 120,120a encounter a relatively high terrain obstruction such that vertical displacement of front axle 62 meets and then exceeds the compression limit or air springs 82,82a, the air springs "bottom out" and axle 62 is directly coupled to walking beam 26. Further upward deflection of front axle 62 required to surmount the larger road obstruction lifts trunnion tube 16 and at the same time compresses rear air springs 108,108a effectively to transfer the remainder of the displacement load to the rear air springs.

In accordance with conventional practice, air springs 82,82a,108, and 108a are to be connected through height level control valves or the like (not shown) to a suitable air source. Air springs possess a working range in which spring force is substantially constant and independent of spring deflection. Air pressure is to be adjusted under various trailer load conditions to locate the spring operating characteristics under such conditions within this working range. As a further feature of the invention which is particularly useful as applied to mobile homes, the springs may be fully inflated thereby to lift the mobile home frame and home to an elevated position at a home site. Suitable blocks or the like may then be placed under the mobile home frame as is conventional, and clamps 20 (FIG. 2) may be released. Thereafter, when springs 82,82a,108 and 108a are deflated, the suspension system may be withdrawn from beneath the mobile home frame, returned to the mobile home factory or sales outlet and reused any number of times.

In accordance with an another important aspect of the present invention, direct rigid coupling between the respective pairs of torque arms 66,66a and 90,90a and the axles 62,64 helps stabilize the suspension system when the wheel or wheels on one side of the system are lifted or displaced vertically with respect to the wheel on the opposing side of the same axle, and thereby helps to correct vehicle roll commonly associated with air spring suspension systems. More specifically, if wheel 120 on one end of forward axle 62 is lifted with respect to the other forward wheel 120a, torque arm 66 will pivot about the associated bushing 70 against the restraining force of torsional twisting of axle 62. This tilting of the axle relative to the centerline of bushings 70,70a places the axle in torsion, thereby yieldably to resist the lifting force on wheel 120 and thus help stabilize the suspension system. Tubular axles are preferred as providing maximum torsional spring strength per unit mass of axle material.

Figure 2:
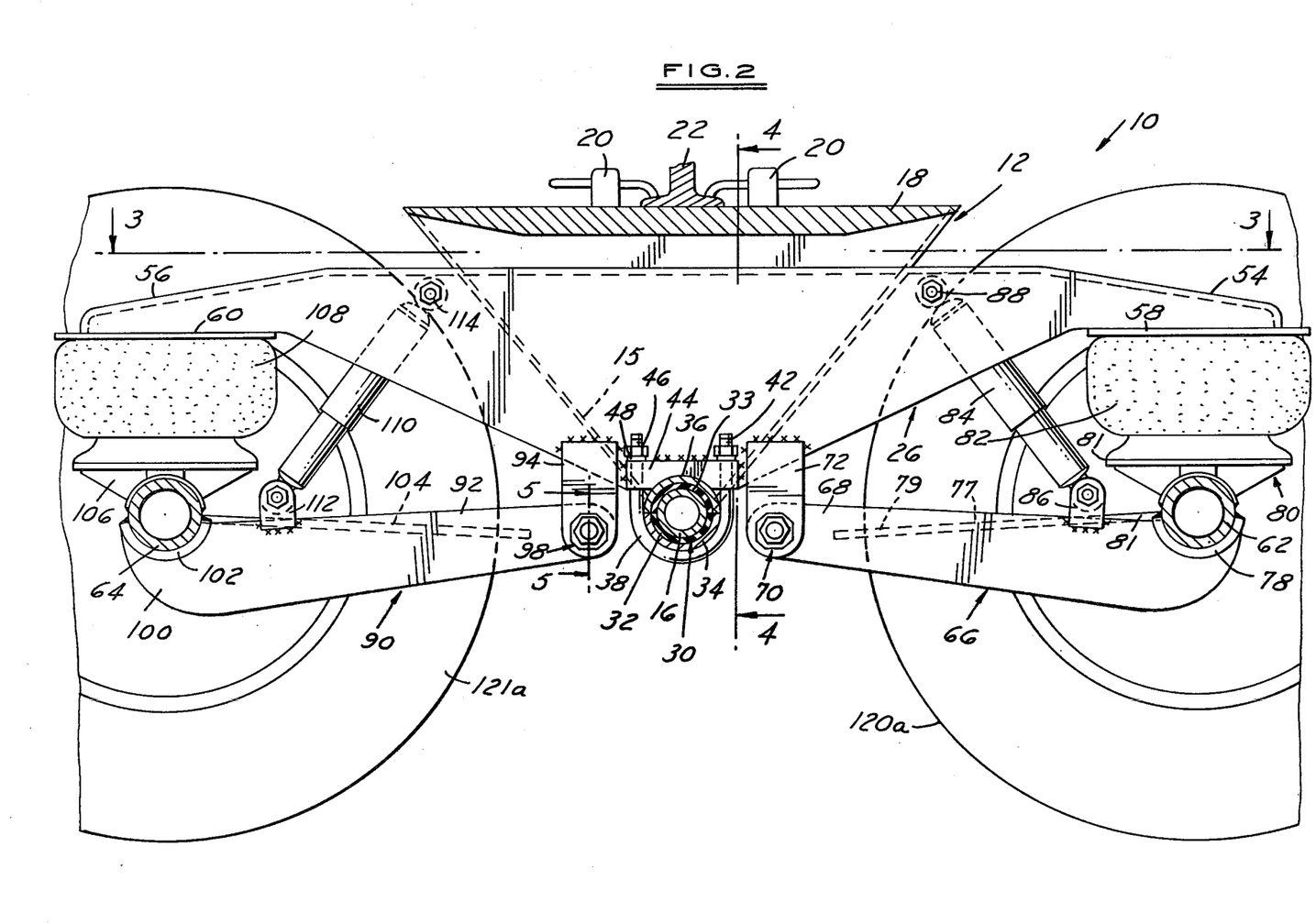
FIG. 2 is a partially sectional elevational view of the suspension system and is taken substantially along the line 2—2 in FIG. 4.

It will also be noted, particularly with reference to FIG. 2, that the axes of axles 62,64 are coplanar with the axis of trunnion tube 16. The pivotal axes of bushings 70,98, however, are disposed on a plane below the common axial plane of axles 62,64 and trunnion 16. Hence, when roll forces load one side of the suspension, e.g. suspension structure 10, more heavily than the other side, as when the trailer is swaying, depression or lowering of trunnion tube 16 at the more heavily loaded side relative to the elevation of the ends of axles 62,64 causes the torque arms 66,90 to pivot upwardly as their outer ends move closer to beam 26. This pivotal motion effectively shortens the distance between the forward and rearward axle ends on the more heavily loaded side while the opposite reaction occurs on the other side of the suspension. This feature of the invention provides an inherent positive steering characteristic which tends to correct or counter-steer the vehicle roll. A further feature of the invention lies in provision of the integral torque-arms/track-bars which retard lateral or axial displacement of the axles with respect to the vehicle frame by stiffening or bracing the axle-torque-arm framework. It will also be noted with reference to FIG. 4 that the vehicle load is placed on trunnion tube 16 on either side of and closely adjacent the pivotal "plane" of walking beam 26. This structure is particularly advantageous in that substantial bending moments on either end of the trunnion tube are avoided.

Details of adjustable torque arm bushing 98 will be best appreciated with reference to FIGS. 5-8, the structure of bushings 70,70a and 98a being identical thereto. Referring to these drawing figures, torque arm 90 terminates at its forward or inner end in a cylindrical eye 120 having an internal channel or cavity 122. A bushing 124 comprising a coaxial pair of generally cylindrical elastomeric bushing members 126,128 is disposed within eye 120 and encompass a bushing sleeve 130 comprised of two coaxial sleeve members 132,134. The axially outer or non-abutting ends 136,138 of sleeve members 132,134 are toothed or serrated to engage correspondingly inner serrated ends 140,142 of a pair of respective mounting blocks 144,146. Such interlocking serrations or teeth prevent rotation of sleeve members 132,134 with respect to blocks 120,122.

Figure 6:
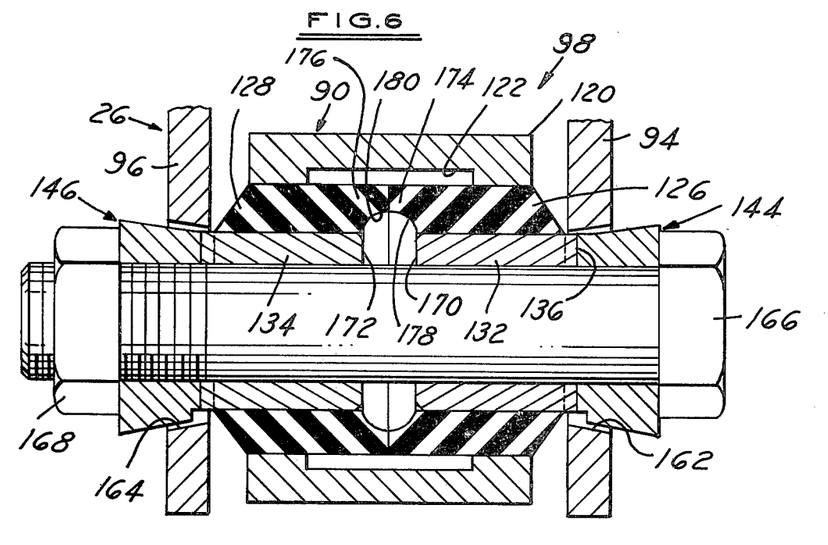
FIG. 6 is a sectional view similar to that of FIG. 5 showing the suspension system at an intermediate stage of the assembly.
Figure 7:
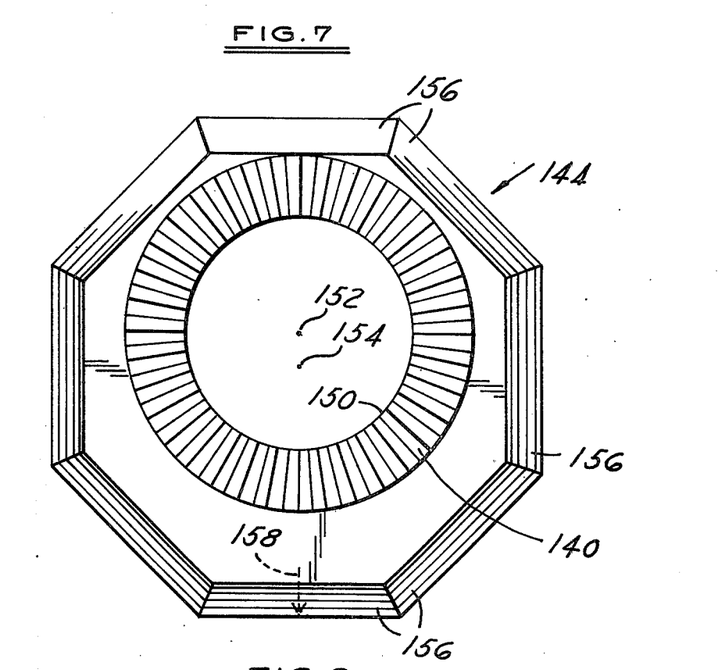
FIGS. 7 and 8 are respective back and side views of a bushing adjustment block in accordance with the present invention.
Figure 8:
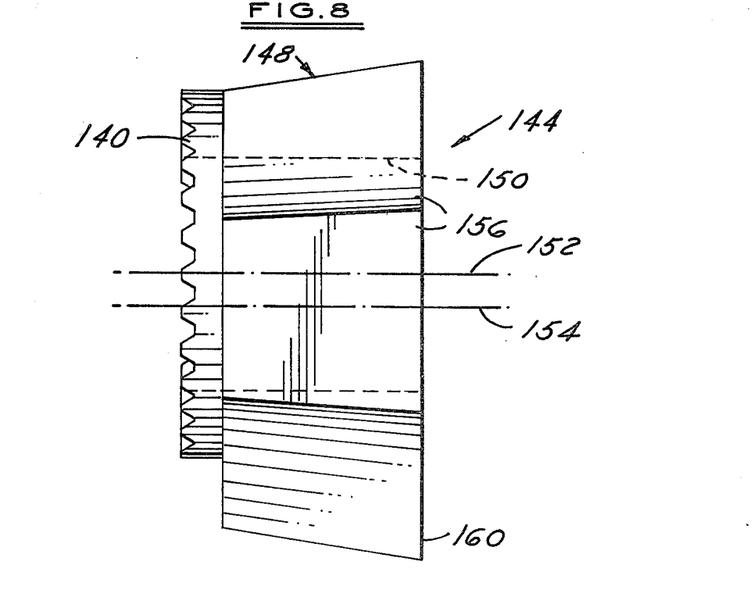

Referring specifically to FIGS. 7 and 8 which illustrate mounting block 144 in detail, serrated block end 140 is formed as a generally circular projection from the block body 148, and encompasses a cylindrical bore 150 extending through the block body eccentrically relative thereto, i.e., the axis 152 of bore 150 is parallel to but laterally spaced from the centerline or axis 154 of the block body. Block body 148 is generally in the shape of a regular or symmetrical octogonal frusto-pyramid having eight side faces 156 converging in the direction of block end 140 coaxially with block axis 154. An index mark 158 is stamped or scribed on the outer wide face 160 of block body 148 in radial alignment with both axes 152,154. Block 146 is identical to block 144. Referring again to FIGS. 5 and 6, blocks 144,146 are received in octagonal frustopyramidal holes 162,164 coaxially laterally spaced from each other in hanger straps 94,96 substantially in parallel with rear axle 64. The threaded end of a bolt 166 is received successively through block 144, sleeve members 132,134 and block 146, and a nut 168 is affixed thereto to clamp blocks 144,146 firmly within openings 162,164.

In the assembly of bushing 98, sleeve members 132,134 with bushing members 126,128 bonded or otherwise adhered thereon are first fitted within eye 120. As best seen in FIG. 6, bushing sections 126,128 have a greater relaxed axial dimension then do sleeve sections 132,134 such that, when sleeve ends 136,138 are separated from each other by about the distance between hanger straps 72,74 in the partially assembled condition illustrated in FIG. 6, the sleeve member inner ends 170,172 are spaced from each other while the bushing member inner ends 174,176 are in abutment. The radially inner faces of bushing member ends 174,176 are beveled outwardly at their inner edges 178,180 for purposes to be described hereinafter. Bushing sections 126,128 are sized to be in slight radial compression between eye 120 and sleeve members 132,134 to hold the sub-assembly together. The loose sub-assembly of eye 120, bushing members 126,128 and sleeve members 132,134 is then positioned between hanger straps 94,96, and blocks 144,146, bolt 166 and nut 168 are positioned loosely as shown in FIG. 6 to hold the bushing together during assembly of the remainder of the suspension system. Initially, index mark 158 (FIG. 7) on each block 144,146 is directed vertically downwardly so that the block bore and body axes 152,154 are aligned vertically.

After the entire tandem suspension (FIG. 1) has been assembled, the suspension system is placed in suitable tooling to measure parallelism between axles 62,64 in the horizontal plane. If the axles are not parallel, one or more of the pairs of mounting blocks 144,146 is rotated within a particular bushing assembly 70,70a,98 or 98a until the axles are parallel, there being sufficient radial clearance between block faces 156 and the faces of the associated hole 162,164 to permit relative rotation therebetween. For example, if it is initially determined that front axle 62 diverges from rear axle 64 between front bushings 70a and 70 as viewed in FIG. 1, blocks 144,146 in bushing assembly 70 may be rotated counterclockwise as viewed in FIG. 2. During such rotation, the near end of axle 62 as viewed in FIGS. 1 and 2 is pulled toward axle 64, the amount of movement corresponding to each increment of stepwise rotation of blocks 144,146 being a function of the dimensions of the various system elements. For example, each incremental step may represent a one-sixteenth inch movement of axle 62, such that rotation of block indicia 158 from the vertical to a horizontal orientation would pull the near end of axle 62 one-eighth inch toward axle 64. If such adjustment is insufficient to bring the axles into parallelism, bushing 70a could be adjusted in the opposite direction and/or one or both of the bushings 98,98a could be adjusted.

When the desired axle parallelism has been achieved, nuts 168 are tightened such that sleeve member ends 170,172 are brought into abutment and blocks 144,146 are tightly clamped in openings 162,164. Simultaneously, bushing member ends 174,176 are deformed under axial compression such that the elastomeric material of the bushings radially expands into eye cavity 122 frictionally to couple eye 120 firmly to the outer bushing surfaces. The beveled inner edges 178,180 insure that the bushing ends deform outwardly into cavity 122 rather than inwardly between sleeve ends 170,172.

Although the invention has been described in detail in connection with a presently preferred embodiment thereof, many alternatives, modifications and variations are envisioned. For example, separate trunnion means may be carried by each of the pedestals 12,12a for pivotally mounting the corresponding walking beams. However, a common laterally extending trunnion tube as previously described is preferred because such tube inherently tends to align front and rear axles 62,64 and also provides for mounting of supporting braces 24,24a. Similarly, other types of compression springs are contemplated, although air springs are presently preferred for reasons of comfort and stability as previously set forth. Although elastomeric bushings are preferred as described because they require little if any maintenance, other types of lubricated bearings may be utilized without departing from the scope of the invention.

The track bars 77,77a,104 and 104a preferably possess substantial lateral width and lesser thickness as shown in the drawings to permit vertical flexure while resisting lateral movement as previously described. Where enhanced roll stiffness is desired, the track bar may be of more rigid construction, and a pivotal connection may be provided at the adjacent tongue beam. In such a situation, twisting of the axle will be limited to the area between the opposing track bar connections. Although the suspension system disclosed herein has been specifically designed for detachable mounting to a mobile home as described, other reusable applications, such as with transportable storage containers or the like, are contemplated.

In the foregoing description and in the appended claims, positional or directional adjectives such as "forwardly," "rearwardly," "laterally," etc. are employed by way of description and not by way of limitation with respect to the orientation of the structure as viewed in the drawings. It will be understood, of course, that in the system illustrated in FIG. 1, axle 64 could as well have been described as the forward axle and axle 62 as the rearward axle without altering the functional interrelationship of the various elements.

The invention claimed is:

1. A tandem axle suspension system comprising trunnion means, means adapted to suspend said trunnion means beneath a vehicle frame with a trunnion axis extending laterally of the frame, a forward and a rearward vehicle axle disposed one on either side of said trunnion axis, first and second laterally spaced walking beams pivotally carried by said trunnion means so as to be disposed beneath opposite sides of a vehicle frame with each said beam including forward and rearward portions overlying said forward and rearward axles, first and second forward torque arms each pivotally connected at one end by a bushing assembly to a corresponding first and second beam and rigidly connected at the other end to said forward axle underlying said forward portions of said beams such that each said forward torque arm provides a direct rigid couple between said forward axle and the corresponding bushing assembly, first and second rearward torque arms each pivotally connected at one end by a bushing assembly to a corresponding first and second beam and rigidly connected at the other end to said rearward axle underlying said rearward portions of said beams such that each said rearward torque arm provides a direct rigid couple between said rearward axle and the corresponding bushing assembly, and a plurality of compression spring means disposed individually between said beam portions and the associated underlying axle, said direct rigid couples provided by said torque arms being effective when one end of either of said axles is displaced vertically with respect to the other end of the same said axle to place a restraining torque on the said displaced axle and thereby tend to stabilize said suspension system.

2. The suspension system set forth in claim 1 wherein said forward and rearward axles are tubular, said other end of each said arm including a part-cylindrical shoulder externally encompassing a said axle and rigidly attached thereto.

3. The suspension system set forth in claim 1 or 2 wherein said arms are pivotally coupled to said beam on pivotal axes which are substantially coplanar on a plane deposed below said trunnion axis.

4. The suspension system set forth in claim 3 wherein axles of said forward and rearward axles are substantially coplanar with said trunnion axis.

5. The suspension system set forth in claim 1 wherein said compression spring means comprise air springs.

6. The suspension system set forth in claim 5 wherein said means adapted to suspend said trunnion means includes means for removably clamping said suspension system to a vehicle frame.

7. The suspension system set forth in claim 1 further comprising hollow pedestal means for suspending said trunnion means from a vehicle frame, and wherein each said beam is pivotally coupled to said trunnion means internally of said pedestal means such that bending movements on said trunnion means are minimized.

8. The suspension system set forth in claim 1 wherein said arms are pivotally coupled to said beams by individual bushing assemblies, each said bushing assembly including means for adjusting parallelism of said axles with respect to each other.

9. The suspension system set forth in claim 8 wherein said bushing assemblies each comprise means carried by said beam for defining a pair of polygonal openings spaced from each other on a common axis generally parallel to said axles, an eye on said one arm end received between said openings, mounting blocks having polygonal cross sections received in said openings and central bores aligned on an axis offset from the axis of said openings, bushing means telescopically received in said eye and including bushing rod ends projecting through said block bores, and means coupled to said rod ends selectively for loosening said blocks in said openings such that said blocks may be rotated within said openings eccentrically about said common axis for stepwise adjustment of axle alignment and for clamping said blocks within said openings such that said polygonal block cross sections cooperate with said polygonal openings inherently to resist rotation within said openings.

10. In an axle suspension system of the type which includes an axle, axle support means extending laterally of said axle, hanger means adapted to be coupled to a vehicle frame and a bushing assembly for pivotally securing said axle support means to said hanger means, the improvement wherein said bushing assembly comprises a pair of polygonal openings in said hanger means spaced from each on a common axis generally parallel to said axle, an eye on said axle support means received in said hanger means between said openings, mounting blocks having polygonal cross sections received in said openings and central bores aligned on an axis offset from said common axis of said openings, bushing means telescopically received in said eye and including bushing rod ends projecting through said block bores, and means coupled to said rod ends selectively for loosening said blocks in said openings such that said blocks may be rotated within said openings eccentrically about said common axis for step-wise adjustment of axle alignment and for clamping said blocks within said openings such that said polygonal block cross sections cooperate with said polygonal openings inherently to resist rotation within said openings.

11. The axle suspension system set forth in claim 10 wherein said block cross sections and said openings describe complementary regular octagons.

12. The axle suspension set forth in claim 11 wherein said openings and said blocks describe octagonal frustopyramids.

13. The axle suspension system set forth in claim 10 or 12 wherein said bushing means comprises a first sleeve, a shaft received in said sleeve and extending therefrom to define said rod ends, and an elastomeric second sleeve extending between and coupled to said first sleeve and said eye.

14. The suspension system set forth in claim 13 wherein abutting faces of said first sleeve and said blocks are serrated to prevent rotation between said first sleeve and said blocks when said blocks are clamped within said openings.

15. The suspension system set forth in claim 14 wherein said eye includes a central inwardly directed channel, wherein said first sleeve comprises a coaxial pair of first sleeve segments, and wherein said elastomeric second sleeve comprises a pair of second sleeve segments respectively adhered to said first sleeve segments and including opposed projecting portions which space said first sleeve segments from each other when said blocks are loosened in said openings and which deform into said channel as said blocks are clamped and said first sleeve segments are brought together frictionally to couple said first sleeve segments and said second sleeve segments to said eye.

16. A tandem axle suspension system comprising trunnion means, means adapted to suspend said trunnion means beneath a vehicle frame with a trunnion axis extending laterally of the frame, a forward and a rearward vehicle axle disposed one on either side of said trunnion axis, first and second laterally spaced walking beams pivotally carried by said trunnion means so as to be disposed beneath opposite sides of a vehicle frame with each said beam including forward and rearward portions overlying said forward and rearward axles, first and second forward torque arms each pivotally connected at one end to a corresponding first and second beam and rigidly connected at the other end to said forward axle underlying said forward portions of said beams, first and second rearward torque arms each pivotally connected at one end to a corresponding first and second beam and rigidly connected at the other end to said rearward axle underlying said rearward portions of said beams, a plurality of compression spring means disposed individually between said beam portions and the associated underlying axle, first and second forward track bar means respectively coupled at one end to said first and second beams and extending forwardly and laterally to respective second ends rigidly connected to said forward axle, and first and second rearward track bar means respectively coupled at one end to said first and second beams and extending rearwardly and laterally to respective second ends rigidly connected to said rearward axle.

17. A tandem axle suspension system comprising trunnion means, means adapted to suspend said trunnion means beneath a vehicle frame with a trunnion axis extending laterally of the frame, a forward and a rearward vehicle axle disposed one on either side of said trunnion axis, first and second laterally spaced walking beams pivotally carried by said trunnion means so as to be disposed beneath opposite sides of a vehicle frame with each said beam including forward and rearward portions overlying said forward and rearward axles, first and second forward torque arms each pivotally connected at one end to a corresponding first and second beam and rigidly connected at the other end to said forward axle underlying said forward portions of said beams, first and second rearward torque arms each pivotally connected at one end to a corresponding first and second beam and rigidly connected at the other end to said rearward axle underlying said rearward portions of said beams, a plurality of compression spring means including air springs disposed individually between said beam portions and the associated underlying axle, and shock absorbing means mounted one between each of said arms and the overlying portion of said beam in parallel with the corresponding air spring.

18. A tandem axle suspension system comprising trunnion means, means adapted to suspend said trunnion means beneath a vehicle frame with a trunnion axis extending laterally of the vehicle frame, a beam pivotally carried by said trunnion means having portions projecting forwardly and rearwardly of said trunnion means, a pair of arms pivotally coupled at one end to said beam and respectively projecting forwardly and rearwardly underlying forward and rearward portions of said beams, forward and rearward vehicle axles respectively rigidly coupled to said arms underlying said forward and rearward portions of said beam, compression spring means including air springs disposed between each forward and rearward portion of said beam and the corresponding underlying axle, and shock absorbing means one between each of said arms and the overlying portion of said beam in parallel with the corresponding air spring.

19. A tandem axle suspension system comprising trunnion means, means adapted to suspend said trunnion means beneath a vehicle frame with a trunnion axis extending laterally of the frame, a forward and a rearward vehicle axle disposed one on either side of said trunnion axis, first and second laterally spaced walking beams pivotally carried by said trunnion means so as to be disposed beneath opposite sides of a vehicle frame with each said beam including forward and rearward portions overlying said forward and rearward axles, first and second forward torque arms each pivotally connected at one end to a corresponding first and second beam and rigidly connected at the other end to said forward axle underlying said forward portions of said beams, first and second rearward torque arms each pivotally connected at one end to a corresponding first and second beam and rigidly connected at the other end to said rearward axle underlying said rearward portions of said beams, said arms being pivotally coupled to said beams by individual bushing assemblies with each said bushing assembly including means for adjusting parallelism of said axles with respect to each other, and a plurality of compression spring means disposed individually between said beam portions and the associated underlying axle, said bushing assemblies each comprising means carried by said beam for defining a pair of polygonal openings spaced from each other on a common axis generally parallel to said axles, an eye on said one arm end received between said openings, mounting blocks having polygonal cross sections received in said openings and central bores aligned on an axis offset from the axis of said openings, bushing means telescopically received in said eye and including bushing rod ends projecting through said block bores, and means coupled to said rod ends selectively for loosening said blocks in said openings such that said blocks may be rotated within said openings eccentrically about said common axis for step-wise adjustment of axle alignment and for clamping said blocks within said openings such that said polygonal block cross sections cooperate with said polygonal openings inherently to resist rotation within said openings, said block cross sections and said openings describing complementary regular octagons.

20. The suspension system set forth in claim 19 wherein said openings and said blocks describe octagonal frustopyramids.

21. A tandem axle suspension system comprising trunnion means, means adapted to suspend said trunnion means beneath a vehicle frame with a trunnion axis extending laterally of the vehicle frame, a beam pivotally carried by said trunnion means having portions projecting forwardly and rearwardly of said trunnion means, a pair of arms pivotally coupled at one end to said beam and respectively projecting forwardly and rearwardly underlying forward and rearward portions of said beams, forward and rearward vehicle axles respectively rigidly coupled to said arms underlying said forward and rearward portions of said beam, and compression spring means disposed between each forward and rearward portion of said beam and the corresponding underlying axle, said arms being pivotally coupled to said beams by individual bushing assemblies with each said bushing assembly including means for adjusting parallelism of said axles with respect to each other, said bushing assemblies each comprising means carried by said beam for defining a pair of polygonal openings spaced from each other on a common axis generally parallel to said axles, an eye on said one arm end received between said openings, mounting blocks having polygonal cross sections received in said openings and central bores aligned on an axis offset from the axis of said openings, bushing means telescopically received in said eye and including bushing rod ends projecting through said block bores, and means coupled to said rod ends selectively for loosening said blocks in said openings such that said blocks may be rotated within said openings eccentrically about said common axis for stepwise adjustment of axle alignment and for clamping said blocks within said openings such that said polygonal block cross sections cooperate with said polygonal openings inherently to resist rotation within said openings, said block cross sections and said openings describing complementary regular octagons.

22. A tandem axle suspension system comprising trunnion means, means adapted to suspend said trunnion means beneath a vehicle frame with a trunnion axis extending laterally of the vehicle frame, a beam pivotally carried by said trunnion means having portions projecting forwardly and rearwardly of said trunnion means, forward and rearward vehicle axles respectively underlying said forward and rearward portions of said beam, compression spring means disposed between each forward and rearward portion of said beam and the corresponding underlying axle, a pair of arms each coupled at an inner end to said beam to pivot about an axis and respectively projecting forwardly and rearwardly with outer ends underlying said forward and rearward axles, and means rigidly coupling each said outer end to the corresponding said forward and rearward axle such that motion of each said axle toward and away from the overlying portion of said beam is constrained by the corresponding said arm to pivotal motion about the associated said axis at a fixed radius defined by said arm.

* * * * *

UNITED STATES PATENT AND TRADEMARK OFFICE
CERTIFICATE OF CORRECTION

PATENT NO. : 4,202,564
DATED : May 13, 1980
INVENTOR(S) : Don S. Strader

It is certified that error appears in the above-identified patent and that said Letters Patent are hereby corrected as shown below:

IN THE ABSTRACT

Line 9, "portion" should be -- portions --

IN THE CLAIMS

Claim 5, - column 7 - line 20, before "wherein" insert -- or 22 --

Claim 7, - column 7 - line 1, before "further" insert -- or 22 --

Claim 8, - column 7 - line 1, before "wherein" insert -- or 22 --

Claim 20 - column 10, line 1, after "19" insert -- or 21 --

Signed and Sealed this

Twelfth Day of August 1980

[SEAL]

Attest:

SIDNEY A. DIAMOND

Attesting Officer

Commissioner of Patents and Trademarks